(12) United States Patent
Hoffmann et al.

(10) Patent No.: US 7,749,614 B2
(45) Date of Patent: Jul. 6, 2010

(54) METHOD OF BRAZING A TI-AL ALLOY

(75) Inventors: Carine Hoffmann, Antony (FR); Marie-Pierre Bacos, Antony (FR); Pierre Josso, Issy les Moulineaux (FR); Serge Naveos, Chatenay-Malabry (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 776 days.

(21) Appl. No.: 10/566,052

(22) PCT Filed: Jul. 15, 2004

(86) PCT No.: PCT/FR2004/001854

§ 371 (c)(1),
(2), (4) Date: Mar. 21, 2007

(87) PCT Pub. No.: WO2005/018867

PCT Pub. Date: Mar. 3, 2005

(65) Prior Publication Data

US 2007/0281175 A1    Dec. 6, 2007

(30) Foreign Application Priority Data

Jul. 25, 2003    (FR) .................................. 03 09154

(51) Int. Cl.
| B32B 15/04 | (2006.01) |
| B32B 15/20 | (2006.01) |
| B23K 1/19 | (2006.01) |
| B23K 1/20 | (2006.01) |
| B23K 35/00 | (2006.01) |

(52) U.S. Cl. .................... 428/660; 428/680; 228/262.9; 228/262.31; 228/262.72; 148/528; 148/537; 148/669

(58) Field of Classification Search .................. 428/615, 428/660, 680, 668
See application file for complete search history.

(56) References Cited

U.S. PATENT DOCUMENTS

| 4,869,421 A | 9/1989 | Norris et al. |
| 5,318,214 A | 6/1994 | Lucas, Jr. et al. |

(Continued)

FOREIGN PATENT DOCUMENTS

EP    0 502 426 A1    9/1992

(Continued)

OTHER PUBLICATIONS

Machine Translation, Noda JP 2001-205443 (Jul. 2001).*

(Continued)

*Primary Examiner*—Michael La Villa
(74) *Attorney, Agent, or Firm*—Christie, Parker & Hale, LLP

(57) ABSTRACT

The invention relates to a method of brazing a Ti—Al alloy. According to the invention, a layer of nickel (2) is disposed between a part (1) which is made from titanium aluminide and a brazing sheet (3), such as to enable: the aforementioned part (1) to be brazed to another metallic material (4) without the aluminium diffusing from one to the other; and a stable link with good mechanical strength to be produced. The invention can be used for the assembly of aircraft engine parts which are made from titanium aluminide and nickel-based superalloy.

18 Claims, 1 Drawing Sheet

U.S. PATENT DOCUMENTS

| | | | |
|---|---|---|---|
| 5,354,422 A | * | 10/1994 | Kato et al. .................... 216/14 |
| 5,525,779 A | | 6/1996 | Santella et al. |
| 6,149,051 A | * | 11/2000 | Vollmer et al. ......... 228/262.72 |
| 6,223,976 B1 | | 5/2001 | Clement et al. |
| 6,291,086 B1 | | 9/2001 | Nguyen-Dinh |
| 2002/0116828 A1 | * | 8/2002 | Warashina et al. ............ 30/276 |

FOREIGN PATENT DOCUMENTS

| | | | |
|---|---|---|---|
| EP | 0 904 881 A1 | | 3/1999 |
| JP | 06-071427 | * | 3/1994 |
| JP | 2001-205443 | * | 7/2001 |

OTHER PUBLICATIONS

Machine Translation, Hirayama et al. JP 06-071427 (Mar. 1994).*
International Search Report, dated Mar. 14, 2005, corresponding to PCT/FR2004/001854.

* cited by examiner

METHOD OF BRAZING A TI-AL ALLOY

CROSS-REFERENCE TO RELATED APPLICATION

This application is a National Phase Patent Application of International Application Number PCT/FR2004/001854, filed on Jul. 15, 2004, which claims priority of French Patent Application Number 03/09154, filed on Jul. 25, 2003.

The invention relates to a method of fixing to the surface of a first part composed of a first metal material a second metal material, by melting a brazing alloy adapted to the second material, the first material being an intermetallic Ti—Al alloy.

The intermetallic alloy γ-TiAl has the advantage, relative to other titanium-based alloys such as the alloy known as TA6V and to nickel-based alloys, usually used to manufacture aeronautic engine components, of having a low density combined with a mechanical strength comparable to that of steels and of the aforesaid nickel alloys, which permits a considerable reduction in the mass being carried and therefore of specific consumption.

However, intermetallic alloys of the TiAl type cannot be screwed, bolted or riveted without the risk of cracking since they are fragile cold. It is therefore necessary to use another joining technique, in particular adhesion, welding or brazing. Adhered assemblies cannot be used at temperatures higher than 150° C. Welding demands compatibility between the materials to be welded, which does not exist for example between titanium-based alloys and nickel-, cobalt- and/or iron-based alloys. As for brazing of these materials, problems arise due to the fact that titanium forms with nickel, cobalt and iron eutectic alloys with low melting points. It is therefore necessary to resort to diffusion brazing.

U.S. Pat. No. 4,869,421 A and EP 0 904 881 A describe methods of brazing limited to the joining of two parts composed of titanium aluminide. U.S. Pat. No. 5,318,214 A describes a method of brazing applied in particular to the assembly of a part composed of $Ti_3Al$ and of a part composed of nickel commercially available under the name Hastelloy X. However, the present inventors have not been able to obtain a join by reproducing the modus operandi described in this document, $Ti_3Al$ being replaced by γ-TiAl.

The object of the invention is to form a join by brazing between a first metal material which is some form of Ti—Al alloy and a second metal material which may be in particular an alloy of nickel, cobalt, iron or titanium.

The invention aims in particular at a method of the type defined in the introduction and provides that a layer of nickel is interposed between the first part and the brazing alloy.

Optional, additional or alternative features of the invention are given below:

The second material takes the form of a second pre-formed part in which the layer of nickel and the brazing alloy are pressed between the first and second parts.
The second material takes the form of a covering which is applied over the assembly formed by the first part, the layer of nickel and the brazing alloy.
The layer of nickel takes the form of a pre-formed sheet.
The layer of nickel takes the form of a covering.
The covering of nickel is deposited by electrolytic means.
The layer of nickel has a thickness of at least 30 μm and preferably at least 40 μm.
The second material is a nickel-based alloy.
The assembly to be processed is raised to a temperature higher than the melting point of the brazing alloy for at least ten minutes in a vacuum.
The operation is carried out under a residual pressure lower than $10^{-3}$ Pa.

The further object of the invention is a composite metal part such as can be obtained by the method as defined above, comprising a substrate and an intermetallic Ti-AL alloy, covered with a large number of successive coats, notably a first coat containing the phases $α2-Ti_3AL$, $τ2-Ti_2ALNi$ and $τ3-TiALNi$, second, third and fourth layers formed respectively of the phases $τ4-TiALNi_2$ and $γ'-Ni_3Al$ and of nickel, and a fifth layer of brazing alloy joining the fourth layer to another metal material.

The part according to the invention may comprise at least some of the following features:

the first layer contains islets of $α2-Ti_3Al$ dispersed in a polyphase matrix comprising $α2-Ti_2AlNi$ and $τ3-TiAlNi$.
The first layer comprises a first sub-layer of $α2-Ti_3Al$ and a second polyphase sub-layer comprising $α2-Ti_2AlNi$ and $τ3-TiAlNi$.
The first layer comprises a first sub-layer of $α2-Ti_3Al$, a second sub-layer of $τ2-Ti_2AlNi$ and a third sub-layer of $τ3-TiAlNi$.
The other metal material is a nickel-based alloy.

The features and advantages of the invention are explained in more detail in the description below with reference to the attached drawings.

Figure 1:
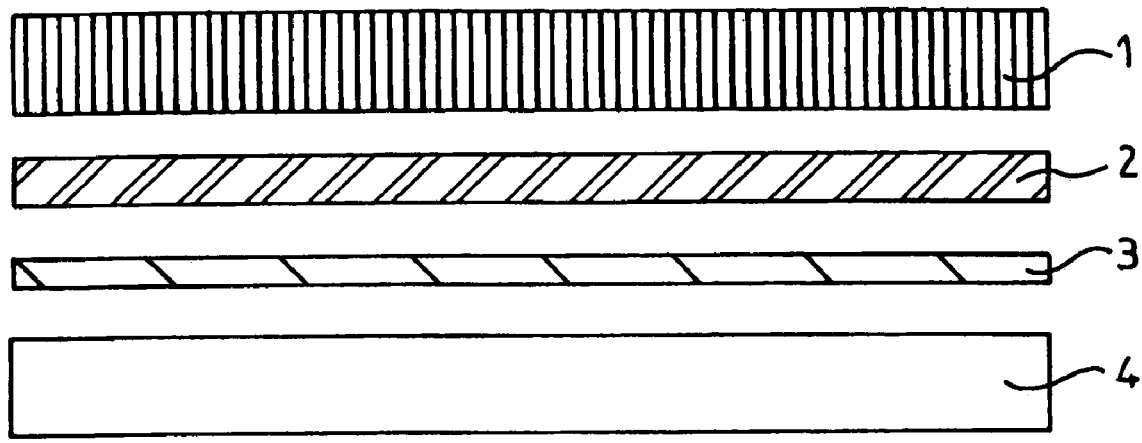
FIG. 1 is a diagrammatic section view showing two metal parts to be assembled, between which are interposed two metal sheets used for assembly by the method according to the invention.

The two parts to be assembled shown in FIG. 1 are a part 1 composed of titanium aluminide and a part 4 composed of nickel-based alloy. According to the invention, the part 1 is deposited on a sheet of nickel 2 whose thickness is preferably at least 40 μm. The assembly is then deposited on a strip 3 of a conventional brazing alloy which may be for example one of the alloys known as TiCuNi 70, TiNi 67 and MBF 1006, or nickel boride $BNi_3$ or silver-copper eutectic alloy, and the whole is deposited on the part 4. The stack obtained is placed in a furnace in a vacuum whose residual pressure is lower than $10^{-3}$ Pa, and is heated to a temperature higher than the melting point of the brazing alloy 3. To improve the quality of the brazed joint, the stack may be subjected to slight compression. A duration of the temperature level of about one hour makes it possible to obtain solidification of the brazing alloy by diffusion of its constituents into the other layers (isothermic solidification), leading to the structure shown in FIG. 2.

Figure 2:
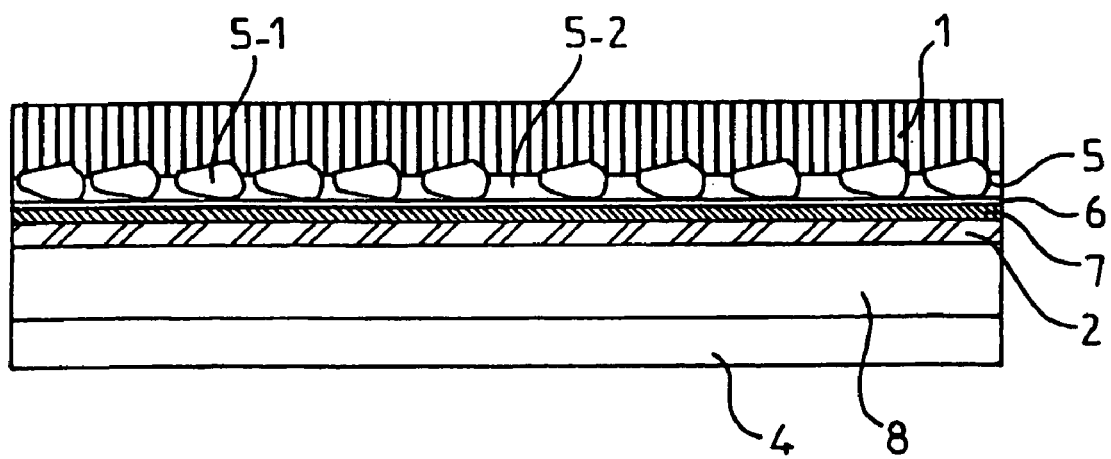
FIG. 2 is a view similar to FIG. 1, showing the assembly obtained by the method according to the invention.

In FIG. 2, an interdiffusion layer 5 adjacent to the titanium aluminide substrate 1 is formed of islets of $α2-Ti_3Al$ 5-1 dispersed in a polyphase matrix 5-2 containing the phases $τ2-Ti_2AlNi$ and $τ3-TiAlNi$. The layer 5 is followed by a continuous layer 6 of the phase $τ4-TiAlNi_2$ and then a continuous layer 7 of $γ'-Ni_3Al$, itself being adjacent to the layer 2 of pure nickel. Between the latter and the part 4 is interposed a layer 8 resulting from the diffusion of the elements of the brazing alloy into the layer 2 and into the part 4.

EXAMPLE 1

This example shows the brazing of a part composed of the alloy γ-TiAl and of a part composed of a nickel alloy sold under the name Nimonic 75. To this end, a sheet of nickel of 60 μm thickness is inserted between a brazing alloy of TiCuNi and the part composed of titanium aluminide, the part composed of nickel alloy being directly in contact with the brazing alloy. The assembly is brought under a pressure of 5 kPa to a temperature of 1050° C. in a vacuum better than $10^{-3}$ Pa for two hours. At the TiAl/nickel interface, aluminium migrates from the TiAl to the nickel. Thus four layers are formed containing respectively 35%, 39%, 26% and 13% aluminium atoms. The result is a stable assembly free of cracks.

The titanium does not appear to have diffused towards the brazing alloy, its content being 60% in atoms at the TiAl/Ni interface.

The sheet of nickel prevents the diffusion of aluminium towards the nickel alloy. The brazing alloy has few precipitates distributed in a non-uniform manner. It is formed of plural phases of different interlocking compositions, notably:

- a dark grey phase of an atomic composition Ti 54%, Ni 30%, Cr 10%;
- a light grey phase and a white phase of respective compositions Ni 45.5%, Ti 38% and Ni 62.5%, Ti 26%, corresponding to the phases TiNi and $Ti_3Ni$ of the binary Ti—Ni diagram; and
- a black phase of composition Ti 87%, Ni 9% (β-Ti).

Nickel diffuses from the nickel alloy to the brazing alloy as is demonstrated by the present of precipitates of pure chromium at the place of the initial interface. A phase is also present containing nickel, titanium and chromium (αTi+η-$Ni_3$Ti+γ-NiCr), titanium being capable of coming either from the brazing alloy or from the TiAl, probably from the latter, the fusion zone of the brazing alloy being low in titanium. The brazing alloy brings about the following reactions:

On the side of the titanium aluminide

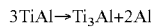

$3TiAl \rightarrow Ti_3Al + 2Al$

And on the side of the nickel alloy

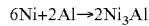

$6Ni + 2Al \rightarrow 2Ni_3Al$

Or the overall reaction

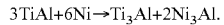

$3TiAl + 6Ni \rightarrow Ti_3Al + 2Ni_3Al.$

The concentration gradient of titanium which results is demonstrated by the presence of different compounds defined along the path of diffusion, forming the layers 5 to 7 described above in relation to FIG. 2. Thus a thermodynamic balance is present.

Brazed samples have been aged in argon at 800° C. for 150 hours. The structure of the interface between the nickel/brazing alloy remains unchanged. The distance between the alloy and the sheet of nickel decreases from 120 to 75 μm. The diffusion front of the nickel has therefore advanced. The TiAl/nickel interface has not moved, which shows that the sheet of nickel effectively stops the diffusion of aluminium. The uniformity of the brazing alloy is increased by ageing.

No development of the interface between the nickel alloy and the brazing alloy was found when the duration of ageing was increased to 300 hours. The phase Ti—Ni—Cr, already reduced after 150 hours, is then totally re-dissolved in its matrix. There only remain in the $Ni_3Ti$ matrix precipitates of chromium.

Mechanical shearing tests have given strength values τ=221.4±7.5 MPa. A metallographic examination after testing shows that the brazed parts are not separated, but that the cracking produced has been deflected, so that it would render unusable an industrial object obtained from this example. This indicates that the layer of nickel acts as a damper which absorbs the thermomechanical stresses (e.g. dilation) or purely mechanical stresses (shearing, fatigue).

The replacement of the TiCuNi brazing alloy with a strip of TiNi 67 leads to a join having substantially the same structure.

EXAMPLE 2

The method is the same as in Example 1, replacing the sheet of nickel with an electrolytic deposition of nickel. To this end, the titanium aluminide is subjected to pre-treatment by sandblasting followed by activation in an aqueous solution containing 40% nitric acid and 3.6% of hydrofluoric acid by mass. The deposition is carried out in a solution of nickel sulphamate dead bath ready for use sold by the firm Frappaz-Imaza, at a temperature of 45° C. and at a current density of 3 $A/dm^2$. As preliminary tests have shown that the thickness of the nickel must be at least 30 μm, a value of 40 μm was selected.

After the brazing treatment, the same succession of layers is obtained as in Example 1, whatever the brazing alloy used, TiCuNi 70 or TiNi 67.

EXAMPLE 3

By following the method of Example 2, a layer of nickel is deposited having a thickness of about 50 μm on to a part composed of a nickel alloy commercially available under the name Hastelloy X. As a brazing alloy, silver-copper eutectic alloy is used, whose melting point is 790° C. The melting points of the different eutectic alloys which may form with titanium are the following: Ag—Ti 960° C., non-eutectic melting, Cu—Ti 885° C. and 960° C., NiTi 942° C. The sheet of brazing alloy is interposed between the nickel covering and a part composed of γ-TiAl and the whole is brought to a temperature of 820° C., 65° C. lower than the lowest of the above melting points, under mechanical pressure of 5 kPa and a vacuum better than $10^{-3}$ Pa for one hour. After this treatment, the metallographic examination shows a perfect join having the same layers containing Ti and Al as before, and in contact with the nickel alloy a layer of AgCu followed by a layer of NiCuAg. If the Ag—Cu brazing alloy is replaced by pure silver, with a contact pressure of about 1 MPa, the adjacent layer to the nickel alloy and of silver, followed by a layer of γ-Ni.

In both cases, the layer of nickel, in thermodynamic balance with the nickel aluminide, acts as a buffer for mechanical stresses as is indicated above.

EXAMPLE 4

This example relates to the brazing of γ-TiAl with a nickel alloy commercially available under the name N 18, and aims to resolve the difficult problem, taking into account the cold fragility of γ-TiAl-type alloys, of fixing of the mobile vanes of aeronautical turbine compressors to discs composed of N 18 alloy, the latter being composed of a nickel-based alloy containing by mass 15.5% cobalt, 11.5% chromium, 6.5% molybdenum, 4.3% aluminium, 4.3% titanium and traces of zirconium, carbon, boron and hafnium.

The method is as in Example 2, replacing the alloy Nimonic 75 with the alloy N 18 and using as a brazing alloy TiNi 67. After this treatment, the TiAl/Ni interface is similar to that obtained in the preceding examples. The diffusion zone between the nickel alloy and the brazing alloy is composed of precipitates of titanium and chromium-molybdenum phase. The assembly can operate at temperatures of 800° C. for more than 300 hours.

EXAMPLE 5

This example shows the formation on a part composed of γ-TiAl of a protection barrier against oxidation and hot corrosion.

A coating of nickel is formed on a sample of γ-TiAl as is described in Example 2, and this coating is covered with a sheet of brazing alloy TiNi 67, then with a sheet of a thickness of 0.1 mm obtained by sintering from a MCrAlY-type alloy available under the name AMDRY 997, which is a nickel-based alloy containing by mass 23% cobalt, 20% chromium, 8.5% aluminium, 4% tantalum and 0.6% yttrium. Heat treatment under vacuum is carried out as is described in Example 2. After this treatment, metallographic examination shows a perfect join having the sequence of layers already described from the substrate TiAl to the nickel sheet. The MCrAlY sheet is strongly adhesive and can thus ensure protection against oxidation and hot corrosion, in particular in the presence of condensed or non-condensed phases containing chlorine.

As a variant, the alloy MCrAlY, instead of being applied in the form of a sheet, can be projected by means of a plasma torch known per se.

The invention claimed is:

1. A method of fixing to the surface of a first part comprising a metal material, a second metal material by melting a brazing alloy adapted to the second material, the first material comprising an intermetallic Ti—Al alloy, characterised in that wherein a layer of nickel having a thickness of at least 30 μm is interposed between the first part and the brazing alloy, wherein said method forms a plurality of successive layers over said first part, wherein said plurality of successive layers comprise a first layer comprising phases $\alpha2$-$Ti_3Al$, $\tau2$-$Ti_7AlNi$ and $\tau3$-$TiAlNi$, and second, third and fourth layers formed respectively of phases $\tau4$-$TiAlNi_2$ and $\gamma'$-$Ni_3Al$ and of nickel, and a fifth layer comprising the brazing alloy connecting the fourth layer to the second metal material.

2. The method according to claim 1, wherein the second material is in the form of a second preformed part and wherein the layer of nickel and the brazing alloy are pressed between the first and second parts.

3. The method according to claim 1, wherein the second material is in the form of a coating which is applied to the assembly formed by the first part, the layer of nickel and the brazing alloy.

4. The method according claim 1, wherein the layer of nickel is in the form of a preformed sheet.

5. The method according to claim 1, wherein the layer of nickel is in the form of a covering.

6. The method according to claim 5, wherein the covering of nickel is deposited by electrolytic means.

7. The method according to claim 1, wherein the layer of nickel has a thickness of at least 40 μm.

8. The method according to claim 1, wherein the second material is a nickel-based alloy.

9. The method according to claim 1, wherein the first part, the layer of nickel, the brazing alloy and the second material are brought to a temperature higher than the melting temperature of the brazing alloy for at least 10 minutes in a vacuum.

10. The method according to claim 9, wherein the method is carried out under a residual pressure of less than $10^{-3}$ Pa.

11. The method according to claim 1, wherein the first layer comprises islets of $\alpha2$-$Ti_3Al$ dispersed in a polyphase matrix comprising $\tau2$-$Ti_2AlNi$ and $\tau3$-$TiAlNi$.

12. The method according to claim 1, wherein the first layer comprises a first sub-layer of $\alpha2$-$Ti_3Al$ and a second polyphase sub-layer comprising $\tau2$-$Ti_2AlNi$ and $\tau3$-$TiAlNi$.

13. The method according to claim 1, wherein the first layer comprises a first sub-layer of $\alpha2$-$Ti_3Al$, a second sub-layer of $\tau2$-$Ti_2AlNi$ and a third sub-layer of $\tau3$-$TiAlNi$.

14. A composite metal part formed using the method as recited in claim 1, comprising said first part and said plurality of successive layers over said first part, and a second part fixed to said first part via said plurality of successive layers, wherein said plurality of successive layers comprise the first layer comprising phases $\alpha2$-$Ti_3Al$, $\tau2$-$Ti_2AlNi$ and $\tau3$-$TiAlNi$, and the second, third and fourth layers formed respectively of phases $\tau4$-$TiAlNi_2$ and $\gamma'$-$Ni_3Al$ and of nickel, and the fifth layer comprising the brazing alloy connecting the fourth layer to the second metal material.

15. The composite metal part according to claim 14, wherein the first layer comprises islets of $\alpha2$-$Ti_3Al$ dispersed in a polyphase matrix comprising $\tau2$-$Ti_2AlNi$ and $\tau3$-$TiAlNi$.

16. The composite metal part according to claim 14, wherein the first layer comprises a first sub-layer of $\alpha2$-$Ti_3Al$ and a second polyphase sub-layer comprising $\tau2$-$Ti_2AlNi$ and $\tau3$-$TiAlNi$.

17. The composite metal part according to claim 14, wherein the first layer comprises a first sub-layer of $\alpha2$-$Ti_3Al$, a second sub-layer of $\tau2$-$Ti_2AlNi$ and a third sub-layer of $\tau3$-$TiAlNi$.

18. The composite metal part according to claim 14, wherein said second metal material is a nickel-based alloy.

* * * * *

UNITED STATES PATENT AND TRADEMARK OFFICE
CERTIFICATE OF CORRECTION

PATENT NO.        : 7,749,614 B2
APPLICATION NO.   : 10/566052
DATED             : July 6, 2010
INVENTOR(S)       : Carine Hoffmann et al.

It is certified that error appears in the above-identified patent and that said Letters Patent is hereby corrected as shown below:

Column 5, Claim 1, lines 31 and 32        Delete "characterised in that"

Signed and Sealed this
Twenty-eighth Day of June, 2011

David J. Kappos
*Director of the United States Patent and Trademark Office*